(12) United States Patent
Biso et al.

(10) Patent No.: US 12,555,791 B2
(45) Date of Patent: Feb. 17, 2026

(54) POLYAMIC ACID DERIVATIVES BINDER FOR LITHIUM ION BATTERY

(71) Applicant: SYENSQO SPECIALTY POLYMERS ITALY S.p.A., Bollate (IT)

(72) Inventors: Maurizio Biso, Milan (IT); Ricardo Rino Pieri, Milan (IT); Eduardo Soriano, Alpharetta, GA (US); Kermit S. Kwan, Cumming, GA (US); Stefano Mauri, Giussano (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 740 days.

(21) Appl. No.: 17/995,275

(22) PCT Filed: Mar. 24, 2021

(86) PCT No.: PCT/EP2021/057551
§ 371 (c)(1),
(2) Date: Sep. 30, 2022

(87) PCT Pub. No.: WO2021/197959
PCT Pub. Date: Oct. 7, 2021

(65) Prior Publication Data
US 2023/0178741 A1 Jun. 8, 2023

Related U.S. Application Data

(60) Provisional application No. 63/003,253, filed on Mar. 31, 2020.

(30) Foreign Application Priority Data

May 5, 2020 (EP) ...................................... 20172958

(51) Int. Cl.
| | | |
|---|---|---|
| *H01M 4/62* | (2006.01) | |
| *H01M 4/02* | (2006.01) | |
| *H01M 4/38* | (2006.01) | |
| *H01M 4/583* | (2010.01) | |
| *H01M 10/0525* | (2010.01) | |

(52) U.S. Cl.
CPC ........... *H01M 4/622* (2013.01); *H01M 4/386* (2013.01); *H01M 4/583* (2013.01); *H01M 4/624* (2013.01); *H01M 10/0525* (2013.01); *H01M 2004/027* (2013.01)

(58) Field of Classification Search
CPC ........................................... C08G 73/10–1003
See application file for complete search history.

(56) References Cited

U.S. PATENT DOCUMENTS

| | | | |
|---|---|---|---|
| 4,579,809 A | 4/1986 | Irving | |
| 5,585,217 A * | 12/1996 | Oba | ................. G02F 1/133723 |
| | | | 430/192 |
| 5,952,448 A * | 9/1999 | Lee | .................... C08G 73/1039 |
| | | | 528/229 |
| 2003/0164090 A1* | 9/2003 | Ding | .................... B01D 71/641 |
| | | | 95/45 |
| 2008/0096997 A1 | 4/2008 | Wu et al. | |
| 2013/0260223 A1 | 10/2013 | Jeong et al. | |
| 2016/0017105 A1 | 1/2016 | Wu et al. | |
| 2017/0155151 A1 | 6/2017 | Bae et al. | |
| 2018/0002567 A1 | 1/2018 | Huang et al. | |
| 2018/0026270 A1 | 1/2018 | Bae et al. | |
| 2019/0067699 A1 | 2/2019 | Bae et al. | |
| 2019/0097220 A1 | 3/2019 | Jung et al. | |

FOREIGN PATENT DOCUMENTS

| | | | |
|---|---|---|---|
| CN | 101117384 A | 2/2008 | |
| EP | 2874212 A1 | 5/2015 | |
| JP | 2017076600 A | 4/2017 | |
| TW | I341851 B | 5/2011 | |
| WO | WO-2018035368 A1 * | 2/2018 | ............. C08G 73/22 |
| WO | 2019191733 A1 | 10/2019 | |

OTHER PUBLICATIONS

Cai et al. Synthesis, characterization and hydrolytic stability of poly (amic acid) ammonium salt. Polymer Degradation and Stability. 96, 2174-2180 (Year: 2011).*
Krishnan et al. Molecular mass determination of polyamic acid ionic salt by size-exclusion chromatography. Journal of Chromatography A. 977, 207-212 (Year: 2002).*
Tomikawa et al. Novel Partial Esterification Reaction in Poly(amic acid) and Its Application for Positive-Tone Photosensitive Polyimide Precursor. Polymer Journal. 41, 8, 604-608 (Year: 2009).*
Yang et al. A Water-Soluble Polyimide Precursor: Synthesis and Characterization of Poly(amic acid) salt. Macromolecular Research. 12, 3, 263-268 (Year: 2004).*
Hegde, M. et al. "3D Printing All-Aromatic Polyimides using Mask-Projection Stereolithography: Processing the Nonprocessable" Advanced Materials, 2017 (published on Jun. 19, 2017), vol. 29, 1701240 (p. 1-7)—DOI:10.1002/adma.201701240—Wiley-VCH Verlag GmbH & Co. KGaA, Weinheim (7 pages).

(Continued)

*Primary Examiner* — Marla D Mcconnell
*Assistant Examiner* — Julia S Caserto
(74) *Attorney, Agent, or Firm* — Osha Bergman Watanabe & Burton LLP

(57) ABSTRACT

Lithiated polyamic acid derivatives used as binders in electrodes for lithium ion batteries are provided. A water-soluble aromatic polyamic-acid derivative (polymer (P-A)) includes at least 50% by moles of recurring units (L), the recurring units (L) having at least one acid moiety in the form of an ester; 0 to 50% by moles of recurring units (M), the recurring units (M) having at least one acid moiety as such or in its imide form; and 25 to 50% by moles of recurring units (N), the recurring units (N) having at least one acid moiety as a salt.

15 Claims, No Drawings

(56) References Cited

OTHER PUBLICATIONS

Krishnan, P. S. G. et al., "Molecular mass determination of polyamic acid ionic salt by size-exclusion chromatography", Journal of Chromatography A, 2002, 977, p. 207-212, Elsevier Science B.V. (6 pages).
International Search Report issued in International Application No. PCT/EP2021/057551 dated Apr. 8, 2021 (4 pages).
Written Opinion issued in International Application No. PCT/EP2021/057551 dated Apr. 8, 2021 (6 pages).

* cited by examiner

POLYAMIC ACID DERIVATIVES BINDER FOR LITHIUM ION BATTERY

CROSS-REFERENCE TO RELATED APPLICATIONS

This application is a U.S. national stage entry under 35 U.S.C. § 371 of International Application No. PCT/EP2021/057551 filed on Mar. 24, 2021, which claims priority to U.S. provisional application No. 63/003,253 filed on Mar. 3, 2020 and to European application No. 20172958.9 filed on May 5, 2020, the entire contents of which are incorporated herein by reference for all purposes.

TECHNICAL FIELD

The present invention pertains to lithiated polyamic acid derivatives and to their use as binders in electrodes for lithium ion batteries.

BACKGROUND ART

Lithium-ion batteries (LIBs) have been applied in a variety of portable electronic devices and are being pursued as power sources for hybrid electric and electric vehicles. To meet the requirements of large-scale applications, LIBs with improved energy density and power capacity are desirable.

Nowadays, the trend in lithium batteries is to enhance their energy capacity by increasing the lithium storage in the anode. For this reason, the conventional graphite anodes enriched with silicon have attracted tremendous interest due to their much higher theoretical energy capacity.

Silicon (Si) has a high capacity (gravimetric capacity of 3572 mAh g$^{-1}$ and volumetric capacity of 8322 mAh cm$^{-3}$ for Li$_{3.75}$Si at room temperature) and low charge-discharge potential (delithiation voltage of around 0.4 V). Unfortunately, silicon also suffers from an extremely large volume change (>400%) (an anisotropic volume expansion) that occurs during lithium ion alloying.

The volume change leads to a number of disadvantages. For example, it may cause severe pulverization and break electrical contact between Si particles and carbon conducting agents. It may also cause unstable solid electrolyte interphase (SEI) formation, resulting in degradation of electrodes and rapid capacity fading, especially at high current densities.

For the above mentioned reasons, electrode formulations for silicon anodes comprise at most 20% by weight of silicon compounds, the remaining being graphite. In particular, electrode formulations comprising graphite and an amount by weight of silicon compounds from 5% and up to 20% are being investigated.

Traditionally, all graphite negative electrodes have relied on polyvinylidene fluoride (PVDF) as a binder. PVDF interacts favorably with graphite particles but does not adhere well to silicon particles, making the binder susceptible to failure resulting from mechanical stress caused by swelling and shrinking of the silicon during charge cycles.

More recently, approaches are pursued wherein use of organic solvents is commonly avoided so as to ensure more environmentally-friendly techniques.

As an example, water-based slurries for use as binders comprising carboxymethyl cellulose (CMC) and styrene-butadiene rubber (SBR) are known in the art. However, CMC/SBR-based binders are brittle and have been found to create failure points within the binder matrix itself. In addition, water-based slurries for use as binders comprising CMC/SBR however show high electric resistance, and consequently reduced lifespan characteristics (EP2874212).

Currently, lithium polyacrylate (LiPAA) exhibits the best properties in the silicon active materials, but easily breaks and has low toughness. Thus, when LiPAA is bent in a cylindrical form, it becomes broken or cracked, which makes it suitable for use only in coin cells.

Polyimides have interesting properties when used as binders in negative electrodes. They have desirable mechanical properties, chemical resistance, and heat resistance, but they are not soluble in water and have a low initial charging/discharging efficiency.

Water-soluble polyamic acid may be used as a binder, providing polyimides by a post-treatment imidization process. However, when an electrode is manufactured using such method, it is difficult to raise the temperature of an electrode plate up to 160° C. or higher, needed for imidization, due to oxidation of a copper (Cu) substrate, and thus, polyimide binders exhibit a low curing rate. If the curing rate is low, carboxylic acid groups of polyamic acid directly bond to lithium ions, and thus an irreversible reaction occurs, which results in decreased initial efficiency. In addition, unstable amide bonds exist, which may adversely affect an extended battery lifespan.

As such, although polyimide binders have high adhesive strength and good mechanical and physical properties, such polyimide binders are not suitable for use in actual industries due to long-term reliability deterioration by unstable bonds occurring due to difficulties in low-temperature curing, a decrease in initial efficiency due to an irreversible reaction of lithium ions, insolubility in water, and the like.

One aim of the present invention is to provide a polymer binder that can be efficiently used as binder for silicon anodes.

SUMMARY OF INVENTION

Provided are binder compositions for lithium batteries that include water-soluble polyamic acid derivatives.

In a first aspect, the present invention relates to water-soluble aromatic polyamic-acid derivatives [polymer (P-A)] comprising:
  a) at least 50% by moles of recurring units (L), said recurring units (L) comprising the at least one acid moiety in the form of ester;
  b) 0 to 50% by moles of recurring units (M), said recurring units (M) comprising the at least one acid moiety as such or in its imide form;
  c) 25 to 50% by moles of recurring units (N), said recurring units (N) comprising the at least one acid moiety as a salt.

According to a second aspect of the present invention, the polymer (P-A) described above may be incorporated in an aqueous binder composition (B), the binder composition (B) comprising the polymer (P-A) as above defined and at least one aqueous solvent.

In another aspect, the present invention relates to an electrode-forming composition [composition (C)] comprising:
  (A) an binder composition (B) as above defined;
  (B) at least one electro-active material;
  (C) optionally, a thermal initiator; and
  (D) optionally, an electroconductivity-imparting additive.

In another aspect, the present invention pertains to the use of the electrode-forming composition (C) for the manufacture of an electrode [electrode (E)], said process comprising:

(i) providing a metal substrate having at least one surface;

(ii) providing an electrode-forming composition [composition (C)] as above defined;

(iii) applying the composition (C) provided in step (ii) onto the at least one surface of the metal substrate provided in step (i), thereby providing an assembly comprising a metal substrate coated with said composition (C) onto the at least one surface;

(iv) drying the assembly provided in step (iii);

(v) submitting the dried assembly obtained in step (iv) to a compression step to obtain the electrode (E) of the invention.

In a further aspect, the present invention pertains to the electrode [electrode (E)] obtainable by the process of the invention.

In still a further object, the present invention pertains to an electrochemical device comprising at least one electrode (E) of the present invention.

DESCRIPTION OF EMBODIMENTS

In the context of the present invention, the term "weight percent" (wt %) indicates the content of a specific component in a mixture, calculated as the ratio between the weight of the component and the total weight of the mixture. When referred to the recurring units derived from a certain monomer in a polymer/copolymer, weight percent (wt %) indicates the ratio between the weight of the recurring units of such monomer over the total weight of the polymer/copolymer. When referred to the total solid content (TSC) of a liquid composition, weight percent (wt %) indicates the ratio between the weight of all non-volatile ingredients in the liquid.

As used herein "water soluble" or "soluble in water" means that at least 99 wt. % of the polymer (P-A) dissolves in deionized water to form a homogenous solution.

By the term "electrochemical device", it is hereby intended to denote an electrochemical cell comprising a positive electrode, a negative electrode and a liquid electrolyte, wherein a monolayer or multilayer separator is adhered to at least one surface of one of said electrodes.

Non-limitative examples of electrochemical devices include, notably, batteries, preferably secondary batteries, and electric double layer capacitors.

For the purpose of the present invention, by "secondary battery" it is intended to denote a rechargeable battery. Non-limitative examples of secondary batteries include, notably, alkaline or alkaline-earth secondary batteries.

By the term "aqueous", it is hereby intended to denote a medium comprising pure water and water combined with other ingredients which do not substantially change the physical and chemical properties exhibited by water.

The term "aromatic polyamic-acid derivative" is intended to denote any polymer comprising at least 50% by moles of recurring units comprising amide moieties and at least one acid moiety, wherein the acid moiety is in the form of ester and at least 25% by moles of recurring units comprising amide moieties and at least one acid moiety, wherein the acid moiety is in the form of a salt.

The recurring units (L) are preferably selected from the group consisting of units of any of general formulae (L1) to (L4):

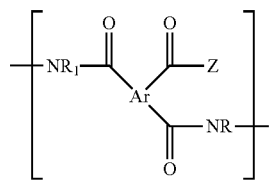

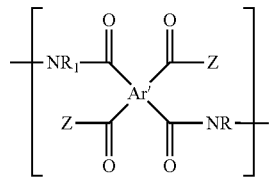

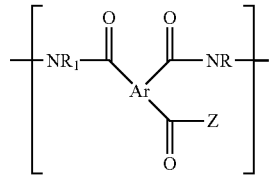

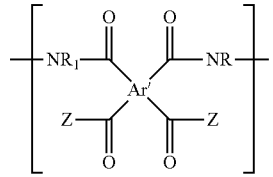

wherein

Ar is independently from each other a trivalent aromatic moiety selected from the group consisting of a substituted or unsubstituted, saturated, unsaturated or aromatic monocyclic and polycyclic group having 5 to 50 carbon atoms;

Ar' is a tetravalent aromatic moiety selected from the group consisting of a substituted or unsubstituted, saturated, unsaturated or aromatic monocyclic and polycyclic group having 5 to 50 carbon atoms;

each $R_1$ is independently H or an alkyl, preferably H or an alkyl having 1 to 5 carbon atoms;

R is a divalent aromatic group; preferably R is selected from the group consisting of the following structures:

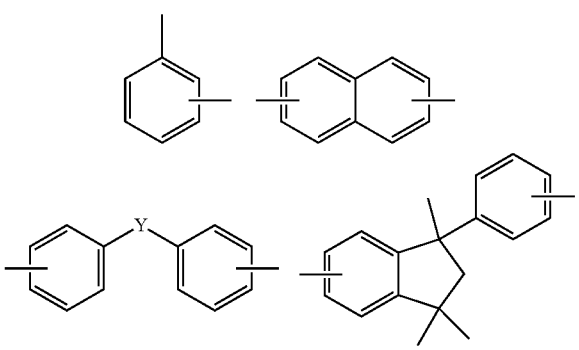

-continued

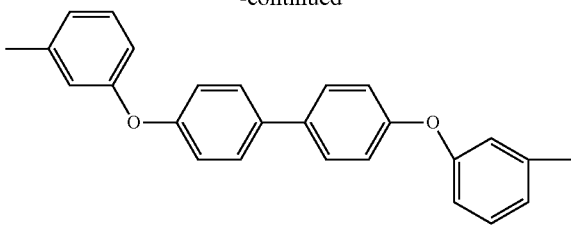

and corresponding optionally substituted structures,
wherein with Y is selected from the group consisting of
—O—, —S—, —SO$_2$—, —CH$_2$—, —C(O)—,
—C(CF$_3$)$_2$—, —(CF$_2$)$_p$—, "p" being an integer from 0 to 5,
more preferably R is:

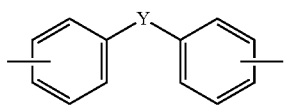

each Z is independently selected from the group consisting of:
- O—(CH$_2$)$_k$—O—CO—CH=CHR$_4$, with k being from 1 to 20, preferably from 1 to 8, more preferably from 2 to 6, even more preferably equal to 2 or 3; and R$_4$ being H or an alkyl, preferably an alkyl having 1 to 5 carbon atoms;
- O—(CH$_2$)$_p$—Ar—CR$_5$=CHR$_6$ or O—(CH$_2$)$_p$—OAr—CR$_5$=CHR$_6$, wherein p is from 0 to 20, preferably from 1 to 8; Ar comprises one or two aromatic or heteroaromatic rings; R$_5$ and R$_6$ are H, an alkyl, preferably an alkyl having 1 to 5 carbon atoms, a phenyl or a COOR$_7$ with R$_7$ being H or an alkyl, preferably an alkyl having 1 to 5 carbon atoms;
- O—(CH$_2$)$_q$—CH=CHR$_8$ with q being from 0 to 20, preferably from 1 to 8; and R$_8$ being H or an alkyl, preferably an alkyl having 1 to 5 carbon atoms;
- O—(CH$_2$)$_r$—O—CH=CHR$_9$ with r being from 0 to 20, preferably from 1 to 8; and R$_9$ being H or an alkyl, preferably an alkyl having 1 to 5 carbon atoms.

The recurring units (M) are preferably selected from the group consisting of units of any of general formulae (M1) to (M4):

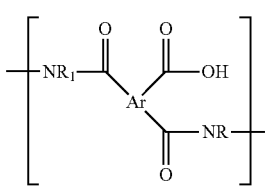
(M1)

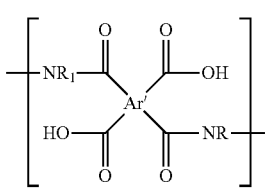
(M2)

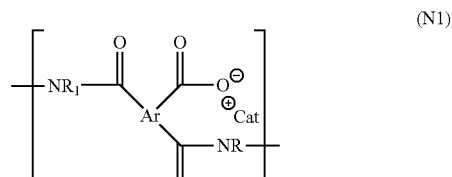
(M3)

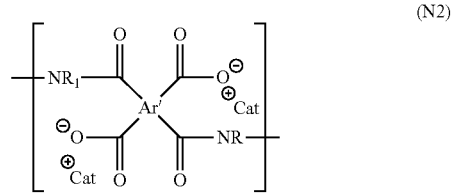
(M4)

wherein Ar, Ar', R and R$_1$ are as above defined, as such or in their imide forms.

The recurring units (N) are preferably selected from the group consisting of units of any of general formulae (N1) to (N4):

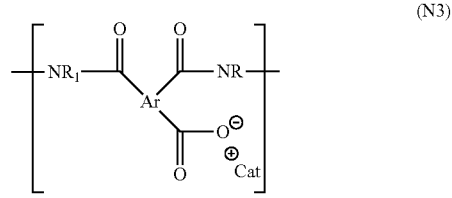
(N1)

(N2)

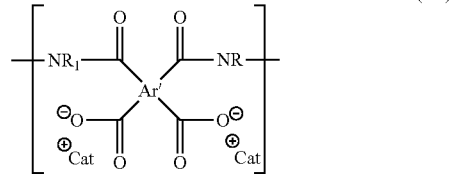
(N3)

(N4)

wherein Ar, Ar', R and R$_1$ are as above defined, and
Cat$^+$ is a monovalent cation preferably selected from alkali metals cations, protonated primary secondary or tertiary ammonium cations, and quaternary ammonium cations, more preferably is selected from Na$^+$, K+ and Li$^+$, even more preferably is Li$^+$.

The trivalent aromatic moiety Ar and the tetravalent aromatic moiety Ar' moieties in the recurring units (L), (M) and (N) as above defined may independently have ortho, meta or para linkages to the other moieties.

Preferably the polymer (P-A) of the present invention is a water-soluble derivative of polyamic acid including:

a) at least 50% by moles of recurring units selected from the group consisting of units of any of general formulae (L2) or (L4);
b) 0 to 50% by moles of recurring units selected from the group consisting of units of any of general formulae (M2) or (M4);
c) 25 to 50% by moles of recurring units selected from the group consisting of units of any of general formulae (N2) or (N4).

In a preferred embodiment of the present invention the $Cat^+$ in the recurring units (N1) to (N4) is $Li^+$.

Most preferably, the polymer (P-A) comprises:
a) at least 50% by moles of recurring units selected from the group consisting of units of any of general formulae (L2);
b) 0 to 50% by moles of recurring units selected from the group consisting of units of any of general formulae (M2);
c) 25 to 50% by moles of recurring units selected from the group consisting of units of any of general formulae (N2).

In a particularly preferred embodiment, Z in the recurring units (M) is a group of formula $O-(CH_2)_k-O-CO-CH=CHR_4$, with k being from 2 to 6, even more preferably equal to 2 or 3; and $R_4$ being H or an alkyl, preferably being H.

Determination of the relative amounts of recurring units (L1) to (L4), (M1) to (M4) and (N1) to (N4) in polymers (P-A) of the present invention can be performed by any suitable method.

In particular, the amount of recurring units (M) in their imide form (degree of imidization of polymer (P-A)) can be assessed by NMR and the amount of recurring units (L), (N) and (M) in acidic form can be assessed by NMR, elemental analysis, or titration.

Polymers (P-A) can be manufactured by a process including the preparation of a polymer (P-A$_0$) by polycondensation reaction between at least one acid monomer and at least one diamine comonomer comprising one or two aromatic rings, followed by partial esterification of the acidic moieties. The resulting partially-esterified polymer (P-A$_0$) is then partially salified to obtain at least a fraction of the acidic moieties in the form of a salt.

According to a first embodiment, the process for preparing polymers (P-A$_0$) comprises at least the following steps:
i) providing at least one diamine comonomer of formula $R_nR_mN-R-NR_nR_m$, wherein R is as above defined and each $R_n$ and $R_m$ is independently H or an alkyl, preferably H or an alkyl having 1 to 5 carbon atoms;
ii) reacting the diamine comonomer provided in step i) with a compound of any one of formulas (I), to (IV):

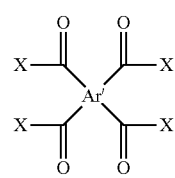

(I)

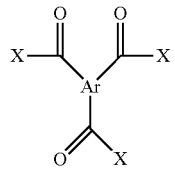

(II)

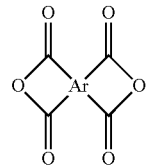

(III)

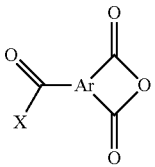

(IV)

wherein Ar, Ar' are as above defined and X is OH, Cl, Br, F or I
in the presence of a polar aprotic solvent and an organic base;
iii) reacting the polymer obtained in step ii) with a compound selected from the group consisting of:
$NR_aR_bR_c-(CH_2)_k-O-CO-CH=CHR_4$, with k and $R_4$ as above-defined,
$NR_aR_bR_c-(CH_2)_p-Ar-CR_5=CHR_6$, with p, Ar, $R_5$ and $R_6$ as above-defined,
$NR_aR_bR_c-(CH_2)_q-CH=CHR_8$, with q and $R_8$ as above-defined,
$NR_aR_bR_c-(CH_2)_r-O-CH=CHR_9$, with r and $R_9$ as above-defined,
wherein $R_a$, $R_b$, and $R_c$ are independently H or an alkyl, preferably an alkyl having from 1 to 5 carbon atoms.

Among the compounds of formula (IV), trimellitic anhydride monoacid chloride (TMAC) is preferred:

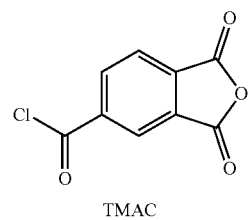 [SMILES: O=C(Cl)c1ccc2c(c1)C(=O)OC2=O]

TMAC

Among the compounds of formula (III), pyromellitic dianhydride (PMDA) is preferred:

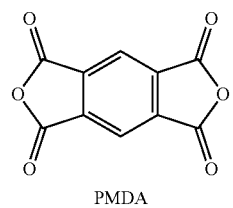

PMDA

Preferably, the diamine comonomer is selected from the group consisting of 4,4'-diaminodiphenylmethane (MDA), 4,4'-diaminodiphenylether (ODA), m-phenylenediamine (MPDA), and combinations thereof:

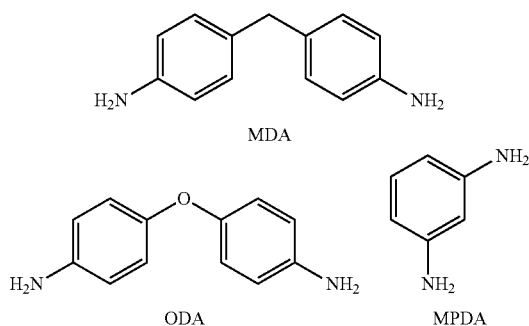

According to an embodiment, the polar aprotic solvent is selected from the group consisting of chlorobenzene, chloroform, N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane.

According to an embodiment, the organic base is selected from the group consisting of pyridine and alkylamine, for example trimethylamine.

Polymers (P-A) can be prepared from the polymers (P-A$_0$) copolymers by at least partially neutralizing acid groups with a salt including a monovalent cation Cat+, preferably an alkaline metal salt in a suitable solvent.

The salt can be any salt of alkaline metal capable of neutralizing the acid groups. In some embodiments, the salt is a lithium salt selected from the group consisting of lithium carbonate, lithium hydroxide, lithium bicarbonate, and combinations thereof, preferably lithium carbonate. In some embodiments, the lithium salt is free of lithium hydroxide.

The solvent for use in the step of salification of polymers (P-A$_0$) to provide polymers (P-A) can be any solvent capable of dissolving the salt and the resulting polymers (P-A). Preferably, the solvent is selected from at least one of an aqueous solvent, such as water, NMP, and alcohols, such as, for example, methanol, isopropanol, and ethanol. Preferably, the solvent includes less than 5 wt. %, preferably less than 2 wt. %, preferably less than 1 wt. % of NMP. More preferably, the solvent is free of NMP. Most preferably, the solvent is an aqueous solvent. Still more preferably the solvent is water.

Preferably the concentration of the salt in the solvent ranges from 0.5 to 30 wt. %, preferably from 5 to 30 wt. %, more preferably 10 to 30 wt. %, based on the total weight of the solvent and the salt.

In some embodiments wherein the salt is a lithium salt, the concentration of the lithium salt in the solvent provides at least 0.5 eq. 1 eq, 1.5 eq, 2 eq, 2.5 eq, 3 eq, 4, eq of lithium to acid groups. In some embodiments, the concentration of the lithium salt in the solvent provides at most 5 eq, preferably at most 4, eq of lithium to acid groups.

The polymers (P-A) can be isolated as a solid from the solution after salification and optionally stored for later use. The solid polymers (P-A) can also be dissolved (or re-dissolved) in water to prepare the electrode-forming composition described below. Preferably, however, the solution including the polymers (P-A) after salification is an aqueous solution that can be used directly, optionally with further dilution with water, in preparing binder composition as described below.

In another aspect, the present invention relates to an electrode-forming composition [composition (C)] comprising:

(A) an binder composition (B) as above defined;
(B) at least one electro-active compounds;
(C) optionally, a thermal initiator; and
(D) optionally, an electroconductivity-imparting additive.

As known in the art, an electrode forming composition is a composition of matter, typically a fluid composition, wherein solid components are dissolved or dispersed in a liquid, which can be applied onto a metallic substrate and subsequently dried thus forming an electrode wherein the metallic substrate acts as current collector. Electrode forming compositions typically comprise at least an electro active material and at least a binder.

The electrode forming composition [composition (C)] of the present invention comprises one or more water-soluble aromatic polyamic-acid derivatives [polymer (P-A)] as defined above, which function as a binder.

The preparation of an electrode-forming composition comprise the preparation of an aqueous binder composition to be then added with the powdery electrode material.

The aqueous binder composition (B) of the present invention may be prepared by dissolving polymer (P-A) in an aqueous solvent, more preferably in water.

For obtaining the binder solution (B) as above detailed, it is preferred to dissolve 1-15 wt. parts, particularly 5-10 wt. parts, of the polymer (P-A) in 100 wt. parts of aqueous solvent.

In a preferred embodiment, the binder composition (B) is the aqueous solution including the polymers (P-A) obtained after partial salification, which can be used directly in the preparation of an electrode-forming composition, optionally with further dilution with water.

The electrode forming composition [composition (C)] of the present invention includes one or more electro-active materials. For the purpose of the present invention, the term "electro-active material" is intended to denote a compound that is able to incorporate or insert into its structure, and substantially release therefrom, alkaline or alkaline-earth metal ions during the charging phase and the discharging phase of an electrochemical device. The electro active material is preferably able to incorporate or insert and release lithium ions.

The nature of the electro active material in the electrode forming composition (C) of the invention depends on whether said composition is used in the manufacture of a negative electrode (anode) or a positive electrode (cathode).

In the case of forming a positive electrode for a Lithium-ion secondary battery, the electro active material may comprise a Lithium containing compound. In one embodiment the lithium containing compound can be a metal chalcogenide of formula LiMQ$_2$, wherein M is at least one metal selected from transition metals such as Co, Ni, Fe, Mn, Cr and V and Q is a chalcogen such as O or S. Among these, it is preferred to use a lithium-based metal oxide of formula LiMO$_2$, wherein M is the same as defined above. Preferred examples thereof may include LiCoO$_2$, LiNiO$_2$, LiNi$_x$Co$_{1-x}$O$_2$ (0<x<1) and spinel-structured LiMn$_2$O$_4$.

In another embodiment, still in the case of forming a positive electrode for a Lithium-ion secondary battery, the electro active material may comprise a lithiated or partially lithiated transition metal oxyanion-based electro-active material of formula M$_1$M$_2$(JO$_4$)$_f$E$_{1-f}$, wherein M$_1$ is lithium, which may be partially substituted by another alkali metal representing less than 20% of the M$_1$ metals, M$_2$ is a transition metal at the oxidation level of +2 selected from Fe, Mn, Ni or mixtures thereof, which may be partially substituted by one or more additional metals at oxidation levels between +1 and +5 and representing less than 35% of the M$_2$ metals, JO₄ is any oxyanion wherein J is either P, S, V, Si, Nb, Mo or a combination thereof, E is a fluoride, hydroxide or chloride anion, f is the molar fraction of the JO₄ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the electro active material in the case of forming a positive electrode has formula $Li_{3-x}M'_yM''_{2-y}(JO_4)_3$ wherein 0≤x≤3, 0≤y≤2, M' and M'' are the same or different metals, at least one of which being a transition metal, JO₄ is preferably PO₄ which may be partially substituted with another oxyanion, wherein J is either S, V, Si, Nb, Mo or a combination thereof. Still more preferably, the electro active material is a phosphate-based electro-active material of formula $Li(Fe_xMn_{1-x})PO_4$ wherein 0≤x≤1, wherein x is preferably 1 (that is to say, lithium iron phosphate of formula LiFePO₄).

In another embodiment, the electro active material for a positive electrode is selected from lithium-containing complex metal oxides of general formula (V)

$$LiNi_xM1_yM2_zY_2 \quad (V)$$

wherein M1 and M2 are the same or different from each other and are transition metals selected from Co, Fe, Mn, Cr and V, 0.5≤x≤1, wherein y+z=1-x, and Y denotes a chalcogen, preferably selected from O and S.

The electro active material in this embodiment is preferably a compound of formula (I) wherein Y is O. In a further preferred embodiment, M1 is Mn and M2 is Co or M1 is Co and M2 is Al.

Examples of such active materials include $LiNi_xMn_yCo_zO_2$, herein after referred to as NMC, and $LiNi_xCo_yAl_zO_2$, herein after referred to as NCA.

Specifically with respect to $LiNi_xMn_yCo_zO_2$, varying the content ratio of manganese, nickel, and cobalt can tune the power and energy performance of a battery.

In a particularly preferred embodiment of the present invention, the electro active material is a compound of formula (V) as above defined, wherein 0.5≤x≤1, 0.1≤y≤0.5, and 0≤z≤0.5.

Non limitative examples of suitable electro active compounds for positive electrode of formula (I) include, notably:
$LiNi_{0.5}Mn_{0.3}Co_{0.2}O_2$,
$LiNi_{0.6}Mn_{0.2}Co_{0.2}O_2$,
$LiNi_{0.8}Mn_{0.1}Co_{0.1}O_2$,
$LiNi_{0.8}Co_{0.15}Al_{0.05}O_2$,
$LiNi_{0.8}Co_{0.2}O_2$,
$LiNi_{0.8}Co_{0.15}Al_{0.05}O_2$,
$LiNi_{0.6}Mn_{0.2}Co_{0.2}O_2$
$LiNi_{0.8}Mn_{0.1}Co_{0.1}O_2$,
$LiNI_{0.9}Mn_{0.05}Co_{0.05}O_2$.

The compounds:
$LiNi_{0.8}Co_{0.15}Al_{0.05}O_2$,
$LiNi_{0.6}Mn_{0.2}Co_{0.2}O_2$,
$LiNi_{0.8}Mn_{0.1}Co_{0.1}O_2$,
$LiNI_{0.9}Mn_{0.05}Co_{0.05}O_2$.
are particularly preferred.

In the case of forming a negative electrode for a Lithium-ion secondary battery, the electro active material may preferably comprise one or more carbon-based materials and/or one or more silicon-based materials.

In some embodiments, the carbon-based materials may be selected from graphite, such as natural or artificial graphite, graphene, or carbon black. These materials may be used alone or as a mixture of two or more thereof.

The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide.

More particularly, the silicon-based compound may be silicon oxide or silicon carbide.

When present in the electro active material, the silicon-based compounds are comprised in an amount ranging from 1 to 60% by weight, preferably from 5 to 20% by weight with respect to the total weight of the electro active compounds.

According to the present invention, a "thermal initiator" is a substance that initiates a radical crosslinking reaction using thermal energy.

The thermal initiator in the composition (C) may be in an amount sufficient to thermally assist the curing of the ethylenically unsaturated components Z of recurring units (L) of polymer (P-A).

The concentration of the thermal initiator in the composition (C) may be between 0.01 to 10 wt. %, based on the total weight of the composition (C), for example between 0.1 and 5 wt. %, between 0.2 and 4 wt. %, or between 0.5 and 3 wt. %.

According to a preferred embodiment of the present invention, the thermal initiator is a low temperature thermal initiator, able to perform curing at temperature not exceeding 130° C.

Suitably, the thermal initiators are selected from the group consisting of free radical initiators such as peroxides (organic and inorganic peroxides), peroxodisulfuric acid and salts thereof, peresters and peroxy carbonates, azonitriles and azo derivatives.

Preferred thermal initiators are selected from the group consisting of:
diacyl peroxides,
benzoyl peroxide (BPO),
Di-tert-butyl peroxide (DTBP),
Cumene Hydroperoxide,
Dicumyl Peroxide,
tert-amyl hydroperoxide,
tert-Amyl peroxybenzoate,
4,4-Azobis(4-cyanovaleric acid,)
1,1'-Azobis(cyclohexanecarbonitrile),
1,1'-Azobis(cyclohexanecarbonitrile),
Benzoyl peroxide,
2,2-Bis(tert-butylperoxy)butane,
1,1-Bis(tert-butylperoxy)cyclohexane Benzene,
2,5-Bis(tert-butylperoxy)-2,5-dimethylhexane,
2,5-Bis(tert-Butylperoxy)-2,5-dimethyl-3-hexyne,
Bis(1-(tert-butylperoxy)-1-methylethyl)benzene,
1,1-Bis(tert-butylperoxy)-3,3,5-trimethylcyclohexane,
tert-Butyl hydroperoxide,
tert-Butyl peracetate,
tert-Butyl peroxide,
tert-Butyl peroxybenzoate,
tert-Butylperoxy isopropyl carbonate,
Cumene hydroperoxide,
Cyclohexanone peroxide,
Dicumyl peroxide,
Lauroyl peroxide,
2,4-Pentanedione peroxide,
Potassium persulfate,
2,2'-azobis(isobutyronitrile) (AIBN),
Dimethyl 2,2'-Azobis(2-methylpropionate),
2,2'-Azobis[2-(2-imidazolin-2-yl)-propane] Dihydrochloride,
2,2'-Azobis(2-methyl-butyronitrile) (AMBN), 2,2'-Azobis(2,4-dimethyl)valeronitrile,
2,2'-Azobis(N-butyl-2-methylpropionamide),
1,1'-Azobis(cyclohexane-1-carbonitrile), and
2,2'-Azobis(4-methoxy-2,4-dimethylvaleronitrile).

According to a preferred embodiment of the present invention, the thermal initiator is a water-soluble thermal initiator, able to be dispersed in aqueous media. Preferred water-soluble thermal initiators are selected from the group consisting of:
2,2'-Azobis(2-methylpropionamidine)dihydrochloride
2,2'-Azobis[N-(2-carboxyethyl)-2-methylpropionami-
    dine]tetrahydrate
2,2'-Azobis[2-(2-imidazolin-2-yl)propane]dihydrochlo-
    ride
2,2'-Azobis[2-(2-imidazolin-2-yl)propane]
2,2'-Azobis[2-methyl-N-(2-hydroxyethyl)propionamide]
4,4'-Azobis(4-cyanovaleric acid)
1,2-Bis(2-(4,5-dihydro-1H-imidazol-2-yl)-propan-2-yl)
    diazene dihydrochloride.

According to a particularly preferred embodiment of the present invention, the thermal initiator is 1,2-Bis(2-(4,5-dihydro-1H-imidazol-2-yl)-propan-2-yl)diazene dihydrochloride.

One or more optional electroconductivity-imparting additives may be added in order to improve the conductivity of a resulting electrode made from the composition of the present invention. Conducting agents for batteries are known in the art.

Examples thereof may include: carbonaceous materials, such as carbon black, graphite fine powder carbon nanotubes, graphene, or fiber, or fine powder or fibers of metals such as nickel or aluminum. The optional conductive agent is preferably carbon black. Carbon black is available, for example, under the brand names, Super P® or Ketjenblack®.

When present, the conductive agent is different from the carbon-based material described above.

The amount of optional conductive agent is preferably from 0 to 30 wt. % of the total solids in the electrode forming composition. In particular, for cathode forming compositions the optional conductive agent is typically from 0 wt. % to 10 wt. %, more preferably from 0 wt. % to 5 wt. % of the total amount of the solids within the composition.

For anode forming compositions which are free from silicon based electro active compounds the optional conductive agent is typically from 0 wt. % to 5 wt. %, more preferably from 0 wt. % to 2 wt. % of the total amount of the solids within the composition, while for anode forming compositions comprising silicon based electro active compounds it has been found to be beneficial to introduce a larger amount of optional conductive agent, typically from 0.5 to 30 wt. % of the total amount of the solids within the composition.

The electrode-forming composition (C) of the invention can be used in a process for the manufacture of an electrode [electrode (E)], said process comprising:
(i) providing a metal substrate having at least one surface;
(ii) providing an electrode-forming composition [composition (C)] as above defined;
(iii) applying the composition (C) provided in step (ii) onto the at least one surface of the metal substrate provided in step (i), thereby providing an assembly comprising a metal substrate coated with said composition (C) onto the at least one surface;
(iv) drying the assembly provided in step (iii);
(v) submitting the dried assembly obtained in step (iv) to a compression step to obtain the electrode (E) of the invention.

The metal substrate is generally a foil, mesh or net made from a metal, such as copper, aluminum, iron, stainless steel, nickel, titanium or silver.

Under step (iii) of the process of the invention, the electrode forming composition (C) is applied onto at least one surface of the metal substrate typically by any suitable procedures such as casting, printing and roll coating.

Optionally, step (iii) may be repeated, typically one or more times, by applying the electrode forming composition (C) provided in step (ii) onto the assembly provided in step (iv).

Under step (iv) of the process of the invention, drying may be performed either under atmospheric pressure or under vacuum. Alternatively, drying may be performed under modified atmosphere, e.g. under an inert gas, typically exempt notably from moisture (water vapour content of less than 0.001% v/v).

The drying temperature will be selected so as to effect removal by evaporation of the aqueous medium from the electrode (E) of the invention.

In step (v), the dried assembly obtained in step (iv) is submitted to a compression step such as a calendaring process, to achieve the target porosity and density of the electrode (E) of the invention.

Preferably, the dried assembly obtained at step (iv) is hot pressed, the temperature during the compression step being comprised from 25° C. and 130° C., preferably being of about 60° C.

Preferred target density for electrode (E) is comprised between 1.4 and 2 g/cc, preferably at least 1.55 g/cc. The density of electrode (E) is calculated as the sum of the product of the densities of the components of the electrode multiplied by their mass ratio in the electrode formulation.

Without wishing to be bound to by any theory, the inventors believe that during drying step (iv), the composition (C) applied onto at least one surface of the metal substrate undergoes curing.

By "curing" is meant herein the process of forming an irreversibly crosslinked network (the so-called "cured form"), by reaction of the ethylenically unsaturated components Z of recurring units (L) of polymer (P-A), so that the material can no longer flow, be melted or dissolved. Herein, the terms "curing" "cure" and crosslinking" are used interchangeably.

It is understood that the curing started in step (iv) of the process for the preparation of electrode (E) may be continued during step (v) of the process of the invention for preparing the electrode (E).

The curing of the composition (C) of the invention takes place to a certain degree at low temperature for the duration of the drying and/or the compression steps (iv) and (v).

The curing of the polymers (P-A) in composition (C) in the electrode (E) of the invention can be verified by determining the consumption of the ethylenically unsaturated components as a result of measuring the change in the peak area of the peak(s) that correspond to out of plane C—H bending vibrations that arise between 1000 and 650 $cm^{-1}$ by Fourier transform infrared spectroscopy (FTIR).

Advantageously, the polymers (P-A) of the invention are particularly suitable to be cured when in the presence of a thermal initiator as above defined.

The Applicant has surprisingly found that when a composition (C) comprising:
a polymer (P-A) as above defined, at least one aqueous medium,
at least one electro-active material,
a thermal initiator and
optionally, an electroconductivity-imparting additive,
is subjected to a thermal treatment, such as that during drying step (iv) and/or compression step (v), an electrode (E) characterized by improved adhesion to the metal collector can be obtained.

In a further aspect, the present invention pertains to the electrode [electrode (E)] obtainable by the process of the invention.

Therefore the present invention relates to an electrode (E) comprising:
a metal substrate having at least one surface, and
directly adhered onto at least one surface of said metal substrate, at least one layer consisting of a composition comprising:
A) a water-soluble aromatic polyamic-acid derivatives [polymer (P-A)] comprising
   a) at least 50% by moles of recurring units (L), said recurring units (L) comprising the at least one acid moiety in the form of ester;
   b) 0 to 50% by moles of recurring units (M), said recurring units (M) comprising the at least one acid moiety as such or in its imide form;
   c) 25 to 50% by moles of recurring units (N), said recurring units (N) comprising the at least one acid moiety as a salt;
B) at least one electro-active material;
C) optionally, an electroconductivity-imparting additive.

The composition directly adhered onto at least one surface of said metal substrate corresponds to the electrode forming composition (C) of the invention wherein the aqueous medium of binder composition (B) has been at least partially removed during the manufacturing process of the electrode, for example in step (iv) (drying) and/or in the compression step (v). Therefore all the preferred embodiments described in relation to the electrode forming compositions (C) of the invention are also applicable to the composition directly adhered onto at least one surface of said metal substrate, in electrodes of the invention, except for the aqueous medium removed during the manufacturing process.

In a preferred embodiment of the present invention, the electrode (E) is a negative electrode. More preferably, the negative electrode comprises a silicon based electro active material.

The electrode (E) of the invention is particularly suitable for use in electrochemical devices, in particular in secondary batteries.

The secondary battery of the invention is preferably an alkaline or an alkaline-earth secondary battery.

The secondary battery of the invention is more preferably a lithium-ion secondary battery.

An electrochemical device according to the present invention can be prepared by standard methods known to a person skilled in the art.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXPERIMENTAL PART

Raw Materials
Silicon oxide, commercially available as KSC-1064 from Shin-Etsu, theoretical capacity is about 2100 mAh/g;
Carbon black, available as SC45 from Imerys S.A;
Graphite, commercially available as ACTILION 2 from Imerys.
Carboxymethylcellulose (CMC), available as MAC 500 HC from Nippon Paper;
Styrene-Butadiene Rubber (SBR) suspension (38 wt. % in water), available as Zeon® BM-480B from ZEON Corporation;
Ethylene carbonate:dimethyl carbonate=1:1 in weight percent, available as Selectilyte™ LP 30 from BASF;
Fluoroethylene carbonate (F1EC) available from Sigma Aldrich; and
Vinylene carbonate available from Sigma Aldrich.
1,2-Bis(2-(4,5-dihydro-1H-imidazol-2-yl)propan-2-yl)diazene dihydrochloride available from Sigma Aldrich (thermal initiator, hereinafter).
Poly(4,4'-oxydiphenylene pyromellitamic acid) (Kapton PolyAmic-Acid) solution in NMP (15-16 wt. %) available from Sigma Aldrich
Pyromellitic dianhydride (PMDA) available from Sigma Aldrich
4,4'-diaminophenylether (ODA) available from Sigma Aldrich
Trimethylamine (TEA) available from Sigma Aldrich
Anhydrous N-Methyl-2-pyrrolidone (NMP) available from Sigma Aldrich
Pyromellitic diester acrylate diacid chloride (PADE-HEA-Cl Mw: 487.24 g/mol), synthesized according to methods reported in the literature. Reference can be made in particular to Hedge et al. "3D Printing All-Aromatic Polyimides using Mask-Projection Stereolithography: Processing the Nonprocessable" (Adv. Mater. 2017, 29).

General Procedure for the Determination of Molecular Weight (Mn, Mw, Mz and Mz+1)

The molecular weights were measured by gel permeation chromatography (GPC), using N,N-dimethylformamide as a mobile phase. Two 5p mixed D columns with guard column from Agilent Technologies were used for the separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The number average molecular weight Mn, weight average molecular weight Mw, higher average molecular weight Mz and Mz+1, were reported.

Preparation 1: Polymer A, Prepared According to the Synthesis Procedure in Scheme 1

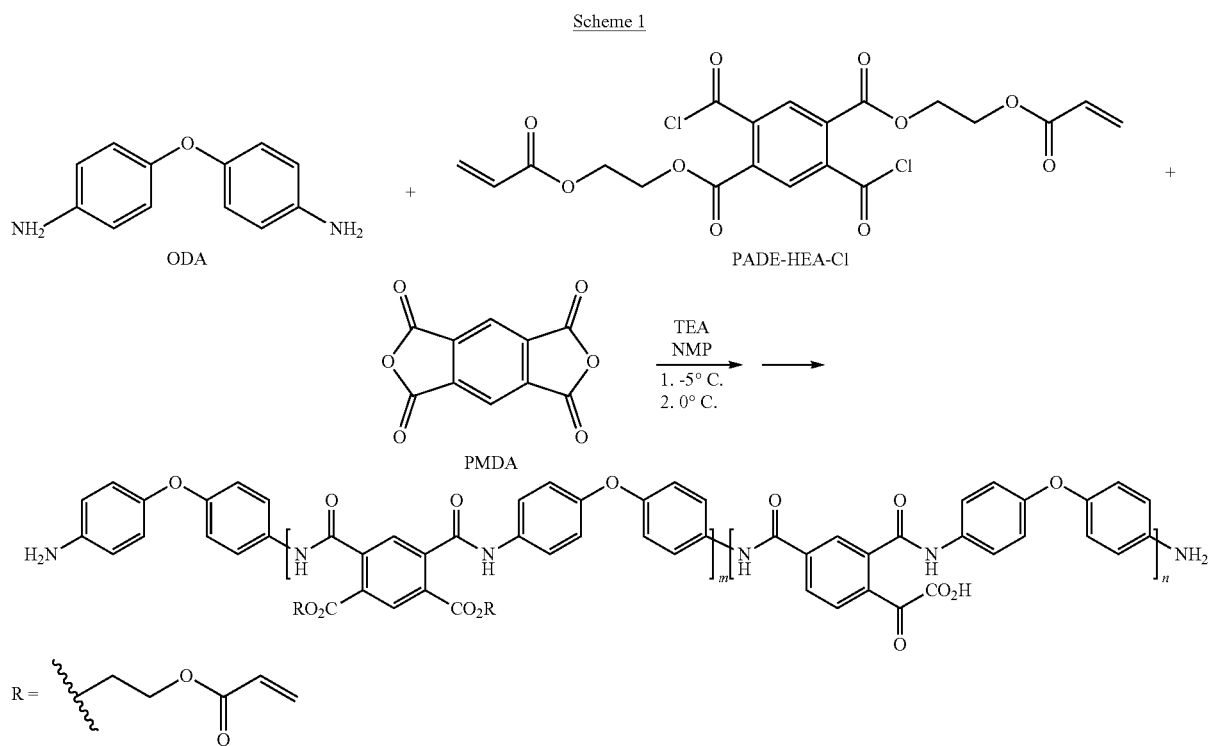

A three neck jacketed 1 L round bottom flask equipped with nitrogen inlet/outlet, thermocouple and mechanical stirrer was charged with 49.83 g of ODA, 27.26 g of TEA, and 750 mL of anhydrous NMP. After dissolution of the ODA, the solution was then cooled to −5.0° C. To the solution, the addition of 27.27 g of PMDA) and 27.42 g (PADE-HEA-CI) was added portion wise over 1.5 h while keeping the solution temperature below 0° C.

After completion of the addition, an additional 100 mL of anhydrous NMP was added to the mixture and held at 0° C. for 3 h. The solution was then discharged and coagulated into 3 L of water using a Warring blender. The precipitated polymer was collected via vacuum filtration and then washed with 3 L of methanol three times. After the washings, the powder was then dried for 48 h at 35° C. under reduced pressure (25 inHg) yielding 119 g of a light yellow powder. Molecular weight of polymer A was calculated. Results are summarized in Table 1.

Preparation 2: Polymer C

A liter of Kapton PolyAmic-Acid solution in NMP (15-16 wt. %) was coagulated into 3 L of deionized water using a Warring blender. The resulting yellow precipitate was collected via vacuum filtration and was then washed with 2 L of boiling water, followed by 2 L of methanol. The yellow powder was dried under reduced pressure (25 inHg vacuum) at 40° C. for 5 days, yielding 154 g of a light yellow powder. Molecular weight of polymer C was calculated. Results are summarized in Table 1.

TABLE 1

|  | Mw | Mn | Mw/Mn | Mz | Mz + 1 | Mz/Mw |
|---|---|---|---|---|---|---|
| Polymer A | 4539 | 37600 | 8.28 | 84600 | 133406 | 2.25 |
| Polymer C | 20733 | 44155 | 2.13 | 65965 | 82449 | 3.18 |

Preparation 3: Binder Composition Comprising Lithiated Water-Soluble Aromatic Polyamic-Acid Derivative Solution Deionized water (91 mL) was charged to a flask with magnetic stirrer. The required amount (1.3 g) of lithium carbonate was added and the solution heated to 50° C. With vigorous agitation, the Polymer A powder obtained as above (8.3 g) was added. After the entire polymer amount was charged to the flask, heating was continued for 5 days, at which time the homogenous solution was discharged. Solutions at 8.3 wt. % in water was so obtained.

Preparation 4: Binder Composition Comprising Lithiated Water-Soluble Aromatic Polyamic-Acid Solution Deionized water (90 mL) was charged to a flask with magnetic stirrer. The required amount (1.3 g) of lithium carbonate was added and the solution heated to 50° C. With vigorous agitation, the Polymer C powder obtained as above (9 g) was added. After the entire polymer was charged to the flask, heating was continued for 3 days, at which time the homogenous solution was discharged. Solutions at 9 wt. % in water was so obtained.

General Procedure for the Preparation of Electrode-Forming Compositions and Negative Electrodes Electrode-forming compositions and negative electrodes were prepared as detailed below using the following equipment:

Mechanical mixer: planetary mixer (Speedmixer) and mechanical mixer of the Dispermat® series with flat PTFE lightweight dispersion impeller;

Film coater/doctor blade: Elcometer© 4340 motorised/automatic film applicator;

Vacuum oven: BINDER APT line VD 53 with vacuum; and

Roll press: precision 4" hot rolling press/calender up to 100° C.

Example 1: Preparation of Negative Electrode Including Lithiated Polymer A

An aqueous composition was prepared by mixing 33.13 g of a 8.3 wt. % solution of lithiated Polymer A obtained in Preparation 3, in water, 14.62 g of deionized water, 10.34 g of silicon oxide, 41.36 g of graphite, and 0.55 g of carbon black. The mixture was homogenized by moderate stirring in planetary mixer for 10 min and then mixed again by moderate stirring for 2 h.

A negative electrode was obtained by casting the electrode-forming composition thus obtained on a 18.5 μm thick copper foil with a doctor blade and drying the coating layer in an oven at temperature of 60° C. for about 60 minutes. The thickness of the dried coating layer was about 65 μm. The electrode was then hot pressed at 60° C. in a roll press to achieve target density of 1.6 g/cc. The resulting negative electrode had the following composition: 18.8 wt. % of silicon oxide, 75.2 wt. % of graphite, 5 wt. % of Polymer A and 1 wt % of carbon black.

Electrode E1 was prepared accordingly.

Example 2: Preparation of Negative Electrode Including Lithiated Polymer A and Thermal Initiator An aqueous composition was prepared by mixing 33.13 g of a 8.3 wt. % solution of lithiated Polymer A obtained in Preparation 4, in water, 14.62 g of deionized water, 10.34 g of silicon oxide, 41.36 g of graphite, 0.55 g of carbon black and 0.05 g of 1,2-Bis(2-(4,5-dihydro-1H-imidazol-2-yl)propan-2-yl)diazene dihydrochloride. The mixture was homogenized by moderate stirring in planetary mixer for 10 min and then mixed again by moderate stirring for 2 h.

A negative electrode was obtained by casting the electrode-forming composition thus obtained on a 18.5 μm thick copper foil with a doctor blade and drying the coating layer in an oven at temperature of 60° C. for about 60 minutes. The thickness of the dried coating layer was about 64 μm. The electrode was then hot pressed at 60° C. in a roll press to achieve target density of 1.6 g/cc. The resulting negative electrode had the following composition: 18.8 wt. % of silicon oxide, 75.2 wt. % of graphite, 5 wt. % of polymer A and 1 wt. % of carbon black.

Electrode E2 was prepared accordingly

Comparative Example 1: Negative Electrode Including Lithiated Polymer C

An aqueous composition was prepared by mixing 30.56 g of a 9 wt. % solution of Polymer C obtained in Preparation 2, in water, 17.19 g of deionized water, 10.34 g of silicon oxide, 41.36 g of graphite, and 0.55 g of carbon black. The mixture was homogenized by moderate stirring in planetary mixer for 10 min and then mixed again by moderate stirring for 2 h.

A negative electrode was obtained by casting the binder composition thus obtained on a 18.5 μm thick copper foil with a doctor blade and drying the coating layer in an oven at temperature of 60° C. for about 60 minutes. The thickness of the dried coating layer was about 60 μm. The electrode was then hot pressed at 60° C. in a roll press to achieve target density of 1.6 g/cc. The resulting negative electrode had the following composition: 18.8 wt. % of silicon oxide, 75.2 wt. % of graphite, 5 wt. % of Polymer C and 1 wt. % of carbon black.

Electrode CE1 was thus obtained.

Comparative Example 2: Negative Electrode Including SBR/CMC

An aqueous composition was prepared by mixing 35.0 g of a 2% by weight solution of CMC, in water, 21.41 g of deionized water, 7.90 g of silicon oxide 31.58 g of graphite and 0.42 g of carbon black.

The mixture was homogenized by moderate stirring in planetary mixer for 10 min and then mixed again by moderate stirring for 1 h.

After about 1 h of mixing, 3.69 g of SBR suspension was added to the composition and mixed again by low stirring for 1 h.

A negative electrode was obtained by casting the binder composition thus obtained on a 18.5 μm thick copper foil with a doctor blade and drying the coating layer in an oven at temperature of 90° C. for about 70 minutes. The thickness of the dried coating layer was about 62 μm. The electrode was then hot pressed at 60° C. in a roll press to achieve target density of 1.6 g/cc. The resulting negative electrode had the following composition: 18.8 wt. % of silicon oxide, 75.2 wt. % of graphite, 3 wt. % of SBR, 2% of CMC and 1 wt. % of carbon black. Electrode CE2 was thus obtained.

Adhesion Properties Measurement of the Negative Electrodes

Peeling tests were performed on electrode (E1), electrode (E2), electrode (CE1), electrode (CE2) by following the standard ASTM D903 at a speed of 300 mm/min at 20° C. in order to evaluate the adhesion of the electrode composition coating on the metal foil.

The results are shown in Table 1.

TABLE 1

| Electrode | Adhesion (N/m) |
|---|---|
| E1 | 5 |
| E2 | 10 |
| CE1 | 14 |
| CE2 | 55 |

Preparation of a Battery

Lithium coin cells (CR2032 type, diameter of 20 mm) were prepared in a glove box under an Ar gas atmosphere, by punching a small disk (diameter=12 mm) of the electrode prepared using the composition of Example 1, example 2, comparative example 1 and comparative example 2, with lithium metal as a reference electrode.

The electrolyte used in the preparation of the coin cells was a standard 1M $LiPF_6$ solution in EC/DMC in ratio 1/1, with 10 wt. % of F1EC and 2 wt. % of VC additive.

Polyethylene separators (commercially available from Tonen Chemical Corporation) were used as received.

Capacity Retention Test in Half Cell

After initial charge and discharge cycles at a low current rate (formation phase), each of the cells prepared as described in Example 1, example 2, comparative example 1 and comparative example 2 were galvanostatically cycled at a constant current rate of C/5-D/5 with positive cut off of 1.5V and negative cut off of 0.05V.

The data obtained are reported in Table 2.

TABLE 2

| Cell | Loading (mAh/cm$^2$) | Coulombic efficiency at cycle 1 (%) | Initial capacity (mAh/g) | Retention after 25 cycles (% with respect to first cycle at C/5) |
|---|---|---|---|---|
| E1 | 2.1 | 79 | 540 | 87 |
| E2 | 2.1 | 79 | 525 | 75 |
| CE1 | 2.1 | 79 | 493 | <70 |
| CE2 | 2.1 | 83 | 550 | 73 |

Cells prepared according to example 1 and example showed acceptable coulombic efficiency, good initial capacity and good retention after 25 cycles.

Advantageously, the electrodes prepared according to the invention present a better compromise between adhesion to current collector and performance in cell in comparison with the electrodes of the prior art.

The invention claimed is:

1. A water-soluble aromatic polyamic-acid derivative (polymer (P-A)) comprising:
   a) at least 50% by moles of recurring units (L), said recurring units (L) each comprising at least one acid moiety in the form of an ester;
   b) 0 to 25% by moles of recurring units (M), said recurring units (M) each comprising at least one acid moiety or an imide thereof; and
   c) 25 to 50% by moles of recurring units (N), said recurring units (N) each comprising at least one acid moiety as a salt.

2. The water-soluble aromatic polyamic-acid derivative (polymer (P-A)) according to claim 1, wherein the recurring units (L) are selected from the group consisting of units of any of general formulae (L1) to (L4):

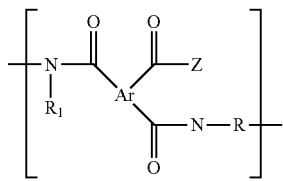
(L1)

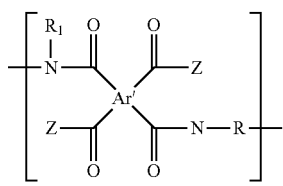
(L2)

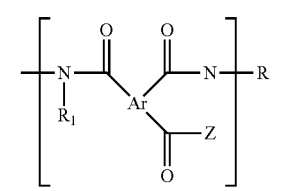
(L3)

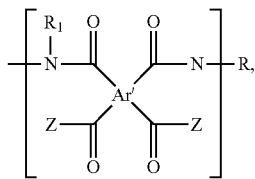
(L4)

wherein
Ar is independently from each other a trivalent aromatic moiety selected from the group consisting of a substituted or unsubstituted, unsaturated or aromatic monocyclic and polycyclic group having 5 to 50 carbon atoms;

Ar' is a tetravalent aromatic moiety selected from the group consisting of a substituted or unsubstituted, unsaturated or aromatic monocyclic and polycyclic group having 5 to 50 carbon atoms;

N is nitrogen:

each $R_1$ is independently H or an alkyl;

R is a divalent aromatic group; and each Z is independently selected from the group consisting of:
—O—$(CH_2)_k$—O—CO—CH=$CHR_4$, with k being from 1 to 20; and $R_4$ being H or an alkyl;
—O—$(CH_2)_p$—Ar—$CR_5$=$CHR_6$ or —O—$(CH_2)_p$—OAr—$CR_5$=$CHR_6$, wherein p is from 1 to 20, Ar comprises one or two aromatic or heteroaromatic rings; $R_5$ and $R_6$ are H, an alkyl, a phenyl or a $COOR_7$ with $R_7$ being H or an alkyl;
—O—$(CH_2)_q$—CH=$CHR_8$ with q being from 0 to 20; and $R_8$ being H or an alkyl; and
—O—$(CH_2)_r$—O—CH=$CHR_9$ with r being from 1 to 20; and $R_9$ being H or an alkyl.

3. The water-soluble aromatic polyamic-acid derivative (polymer (P-A)) according to claim 1, wherein the recurring units (M) are selected from the group consisting of units of any of general formulae (M1) to (M4):

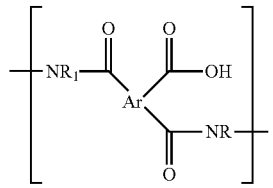
(M1)

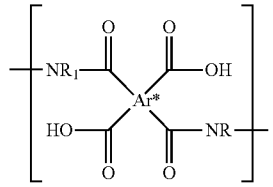
(M2)

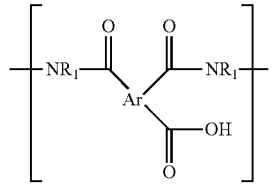
(M3)

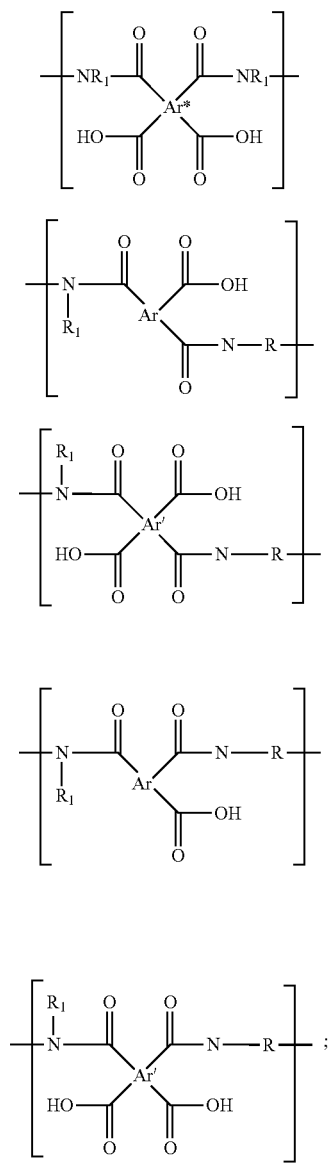

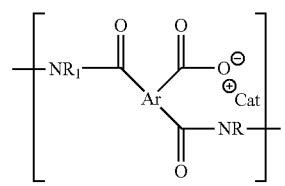
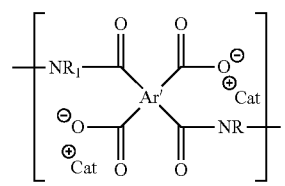
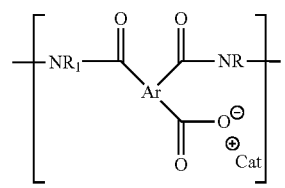
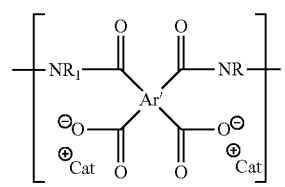
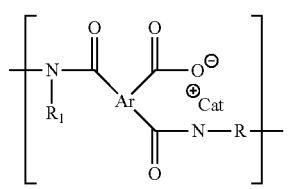
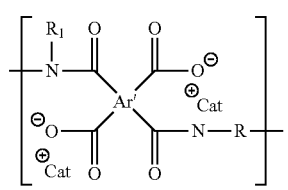
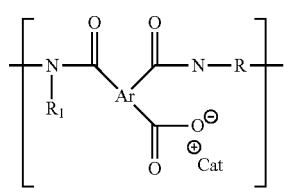
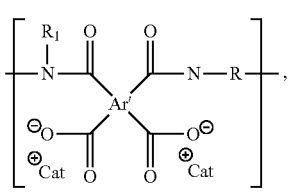

wherein

Ar is independently from each other a trivalent aromatic moiety selected from the group consisting of a substituted or unsubstituted, unsaturated or aromatic monocyclic and polycyclic group having 5 to 50 carbon atoms;

Ar' is a tetravalent aromatic moiety selected from the group consisting of a substituted or unsubstituted, unsaturated or aromatic monocyclic and polycyclic group having 5 to 50 carbon atoms;

N is nitrogen:

each $R_1$ is independently H or an alkyl; and

R is a divalent aromatic group.

4. The water-soluble aromatic polyamic-acid derivative (polymer (P-A)) according to claim 1, wherein the recurring units (N) are selected from the group consisting of units of any of general formulae (N1) to (N4):

wherein

Ar is independently from each other a trivalent aromatic moiety selected from the group consisting of a substituted or unsubstituted, unsaturated or aromatic monocyclic and polycyclic group having 5 to 50 carbon atoms;

Ar' is a tetravalent aromatic moiety selected from the group consisting of a substituted or unsubstituted, unsaturated or aromatic monocyclic and polycyclic group having 5 to 50 carbon atoms;

N is nitrogen:

each $R_1$ is independently H or an alkyl;

R is a divalent aromatic group; and $Cat^+$ is a monovalent cation.

5. The water-soluble aromatic polyamic-acid derivative (polymer (P-A)) according to claim 2, which includes:

a) at least 50% by moles of recurring units selected from the group consisting of units of any of general formulae (L2) or (L4);

b) 0 to 25% by moles of recurring units selected from the group consisting of units of any of general formulae (M2) or (M4):

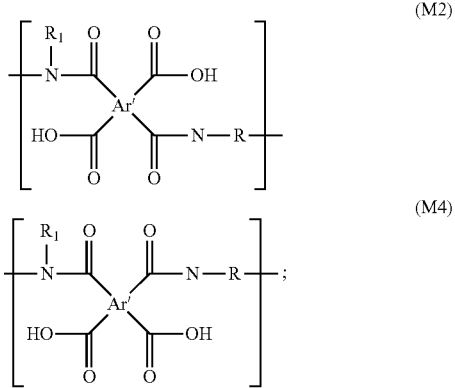

and c) 25 to 50% by moles of recurring units selected from the group consisting of units of any of general formulae (N2) or (N4):

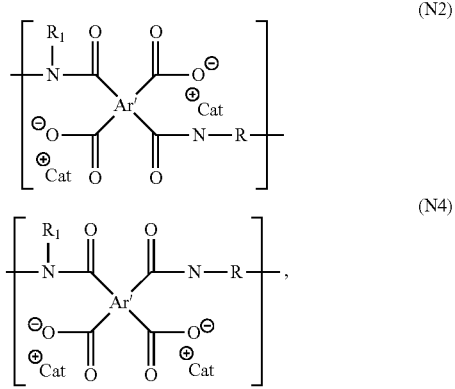

wherein $Cat^+$ is a monovalent cation.

6. An aqueous binder composition (B) comprising the polymer (P-A) according to claim 1 and at least one aqueous solvent.

7. An electrode-forming composition (composition (C)) comprising:

(i) the aqueous binder composition (B) according to claim 6;

(ii) at least one electro-active material;

(iii) optionally, a thermal initiator; and (iv) optionally, an electroconductivity-imparting additive.

8. The electrode-forming composition (composition (C)) according to claim 7, wherein the electro active material comprises a material selected from the group consisting of one or more carbon-based materials, one or more silicon-based materials, and combinations thereof.

9. The electrode-forming composition (composition (C)) according to claim 8, wherein the thermal initiator is 1,2-Bis(2-(4,5-dihydro-1H-imidazol-2-yl)-propan-2-yl)diazene dihydrochloride.

10. The electrode-forming composition (composition (C)) according to claim 7 that comprises:

(a) the aqueous binder composition (B) comprising the polymer (P-A) and the at least one aqueous solvent;

(b) at least one electro-active material selected from one or more carbon-based materials and/or one or more silicon-based materials;

(c) a thermal initiator, which is, 1,2-Bis(2-(4,5-dihydro-1H-imidazol-2-yl)-propan-2-yl)diazene dihydrochloride; and (d) optionally, an electroconductivity-imparting additive.

11. A process of manufacturing an electrode (electrode (E)) from the electrode-forming composition (C) according to claim 7, said process comprising:

(i) providing a metal substrate having at least one surface;

(ii) providing the electrode-forming composition [composition (C)];

(iii) applying the composition (C) provided in step (ii) onto the at least one surface of the metal substrate provided in step (i), thereby providing an assembly comprising a metal substrate coated with said composition (C) onto the at least one surface;

(iv) drying the assembly provided in step (iii); and (v) submitting the dried assembly obtained in step (iv) to a compression step to obtain the electrode (E).

12. An electrode (electrode (E)) obtainable by the process according to claim 11.

13. An electrochemical device comprising at least one electrode (E) according to claim 12.

14. The electrochemical device according to claim 13, said electrochemical device being a secondary battery comprising:

a positive electrode and a negative electrode, wherein at least one of the positive electrode and the negative electrode is the electrode (E).

15. The electrochemical device according to claim 13, said electrochemical device being a secondary battery comprising:

a positive electrode and a negative electrode, wherein the negative electrode is the electrode (E).

* * * * *